United States Patent

Furukawa et al.

[11] Patent Number: 5,684,771
[45] Date of Patent: Nov. 4, 1997

[54] OPTICAL RECORDING MEDIUM DISCRIMINATING APPARATUS

[75] Inventors: Junichi Furukawa; Yoshitsugu Araki, both of Tsurugashima, Japan

[73] Assignee: Pioneer Electronic Corporation, Tokyo, Japan

[21] Appl. No.: 604,310

[22] Filed: Feb. 21, 1996

[30] Foreign Application Priority Data

Feb. 27, 1995 [JP] Japan .................... 7-038594
Mar. 2, 1995 [JP] Japan .................... 7-042869

[51] Int. Cl.$^6$ .................................. G11B 7/00
[52] U.S. Cl. ........................................ 369/58
[58] Field of Search ..................... 369/58, 59, 111, 369/47, 48, 54, 44.26, 44.25, 44.31

[56] References Cited

U.S. PATENT DOCUMENTS

| | | | |
|---|---|---|---|
| 5,003,521 | 3/1991 | Yoshida et al. | 369/44.25 |
| 5,042,020 | 8/1991 | Endo | 369/44.31 |
| 5,130,967 | 7/1992 | Tanaka et al. | 369/53 |
| 5,237,549 | 8/1993 | Shimozawa | 369/44.25 |
| 5,289,451 | 2/1994 | Ashinuma et al. | 369/58 |

*Primary Examiner*—Thang V. Tran
*Attorney, Agent, or Firm*—Morgan, Lewis and Bockius LLP

[57] ABSTRACT

An optical recording medium discriminating apparatus discriminates at least two types of optical recording media having pits of different depths carrying recorded information. A light beam of a predetermined wavelength is caused to be incident to an optical recording medium, the amount of returning light therefrom is detected, and a read signal according to the detected amount of returning light is produced. The amounts of light in two areas, line-symmetrical to each other in the tangential direction of a track consisting of a sequence of pits, are detected from the amount of returning light, and a push-pull signal corresponding to a difference between the amounts of light in the two areas is produced. A phase difference between the read signal and the push-pull signal is detected, to discriminate the type of the optical recording medium is discriminated. In another optical recording medium discriminating apparatus, the amounts of light in two areas, line-symmetrical to each other in the tangential direction of a track consisting of a sequence of pits, are detected from the amount of returning light from the optical recording medium, and a push-pull signal corresponding to a difference between the amounts of light in the two areas is produced. The level of the push-pull signal is compared with a reference level, to discriminate the type of the optical recording medium.

13 Claims, 7 Drawing Sheets

OPTICAL RECORDING MEDIUM DISCRIMINATING APPARATUS

BACKGROUND OF THE INVENTION

1. Field of the Invention

The present invention relates to an apparatus or circuit for optically discriminating the type of an optical recording medium. The invention also relates to an optical recording medium discriminating apparatus suitable for use in an apparatus which reads information from an optical recording medium.

2. Description of the Background Information

Optical disks of 120 mm in diameter, called compact disks (CDs), which carry the data for music reproduction or the like, and optical disks of 300 mm in diameter, called laser disks, which carry the data for images reproduction and speeches or the like, have become popular these days. A disk reading apparatus which handles both types of optical disks is provided with means for detecting the diameter of an information-recorded disk so that can discriminate whether the disk is a compact disk or a laser disk based on the detection output from this means.

Because the discrimination of the disk type is based on the difference in the shape of each disk, the apparatus cannot discriminate between disks which have the same diameter as compact disks but differ therefrom in the recording or reproduction system.

SUMMARY OF THE INVENTION

Accordingly, it is an objective of the present invention to provide a discriminating apparatus which can discriminate between disks which have the same diameter but differ from one another in the recording or reproduction system.

According to the first aspect of the present invention, there is provided an optical recording medium discriminating apparatus for discriminating at least two types of optical recording media having pits of different depths which carry recorded information. The device causes a light beam of a predetermined wavelength to be incident to an optical recording medium detecting the amount of returning light therefrom and producing a read signal according to the detected amount of returning light. The detector detects the amounts of returning light in two areas, line-symmetrical to each other in a tangential direction of a track consisting of a sequence of pits producing a push-pull signal corresponding to the difference between the amounts of light in the two areas. The detector also has a phase comparator for detecting the phase difference between the read signal and the push-pull signal, whereby discrimination of the type of optical recording medium is achieved based on the phase difference.

The optical recording medium discriminating apparatus according to the first aspect of this invention detects the phase difference between a read signal and a push-pull signal, both obtained by a light beam of a predetermined wavelength incident to a recording medium, and discriminates what type of an optical recording medium the depths of recorded-information carrying pits belong, based on this phase difference.

According to the second aspect of this invention, there is provided an optical recording medium discriminating apparatus for discriminating at least two types of optical recording media having pits of different depths which carry recorded information, comprising: A device for causing a light beam of a predetermined wavelength to be incident to an optical recording medium, detecting amounts of light returning light from the optical recording medium in two areas, line-symmetrical to each other in a tangential direction of a track consisting of a sequence of pits, and producing a push-pull signal corresponding to a difference between the amounts of light in the two areas. The detector also has a level comparator for comparing the level of the push-pull signal with a reference level, whereby the type of the optical recording medium is discriminated based on the comparison result from the level comparator.

The optical recording medium discriminating apparatus according to the second aspect of this invention compares the level of a push-pull signal, obtained by a light beam of a predetermined wavelength incident to a recording medium, with the reference level, and discriminates the type of an optical recording medium the depths of recorded-information carrying pits belong, based on the comparison result.

DETAILED DESCRIPTION OF THE PREFERRED EMBODIMENTS

Preferred embodiments of the present invention will now be described with reference to the accompanying drawings.

To begin with, the principle of the disk discrimination of this invention will be described with reference to FIG. 1.

Figure 1:
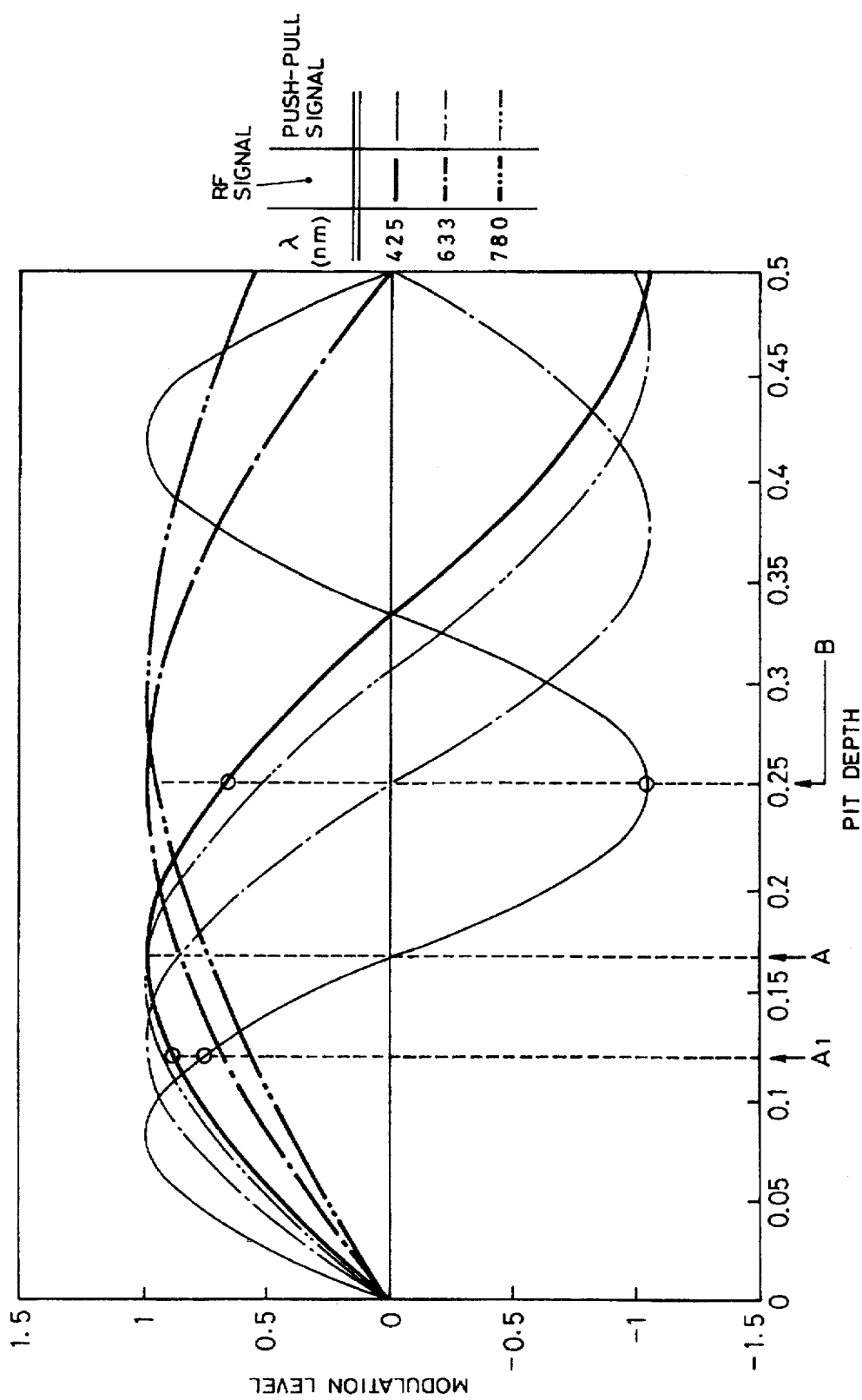
FIG. 1 is a diagram graph showing modulation levels of an RF signal and a push-pull signal with respect to the pit depth for each wavelength of light incident to a disk.

In FIG. 1, the horizontal scale represents the depths of pits (phase depth) in a disk, and values 0 to 0.5 are normalized with 633 nm, while the vertical scale represents the modulation levels (equivalent to the amplitude levels) of an RF (high frequency) signal and a push-pull signal, which are obtained by allowing a single light beam of a wavelength λ (nm) to be incident to a disk having pits with the depth indicated on the horizontal scale and then receiving light reflected and diffracted by the pit surface. The RF signal is a signal according to reflected light of the incident light beam, which has a modulated component dependent on the presence or absence of pits and the pit length, and it is used as a read signal carrying information recorded on the disk. The push-pull signal is produced by the known push-pull method or farfield method and corresponds to the difference between light components of the light reflected and diffracted by the pit surface, which are respectively output from two light-receiving areas that are optically symmetrical to each other with respect to the center of a track. This push-pull signal is used as a tracking error signal for the information reading point.

It is obvious from the graph that whatever the wavelength of the light beam is, if information is recorded with the pit depth that maximizes the modulation level of the RF signal, a push-pull signal with a sufficient amplitude (modulation level=0) cannot be acquired. That is, tracking servo using the push-pull signal cannot be accomplished. As a possible solution to this problem, the modulation level of the RF signal to be set may be made slightly lower than the maximum value so that information is recorded with the pit depth that allows the push-pull signal to have a sufficient modulation level.

Let us now consider short-wavelength disks which have the same outer shape as the above-described CD, whose light beam for reading information has a wavelength set to, for example, 425 nm as one standard for the reproduction system, and which are being developed for the practical use. If disks are normalized in such a way that the pit depth of this type of disk is set smaller than the maximum value of the modulation level of the acquired RF signal and within the range where the polarity of the push-pull signal is not inverted, i.e., smaller than the pitch length D (e.g., a depth $D_1$), the modulation levels of the RF signal and push-pull signal acquired from this normalized disk would both be positive.

With regard to the existing CDs which are long-wavelength disks, information is recorded with the pit depth B of ¼ of 633 nm. As the wavelength of the light beam for reading information is set to 780 nm as one standard for the reproduction system, however, a push-pull signal with a sufficient amplitude can be obtained. If the light beam of 425 nm which is used for the aforementioned short-wavelength disk is incident to this long-wavelength disk, the modulation level of the acquired RF signal becomes positive whereas the modulation level of the push-pull signal becomes negative.

Between the cases where a short-wavelength light beam is incident to a short-wavelength disk and where the short-wavelength light beam is incident to a long-wavelength disk, the polarity of the push-pull signal with respect to that of the RF signal is inverted, i.e., the phase of one signal leads or lags from the phase of the other signal. The principle of the present invention for disk discrimination is to utilize the difference between the phase relationship between the RF signal and push-pull signal, acquired by emitting a light beam of a predetermined wavelength onto a disk of one standard for the recording pits or reproduction wavelength, and the phase relationship between the RF signal and push-pull signal, acquired by emitting the light beam of the predetermined wavelength onto a disk of another standard. The following will specifically discuss how to discriminate disks based on the principle.

Figure 2:
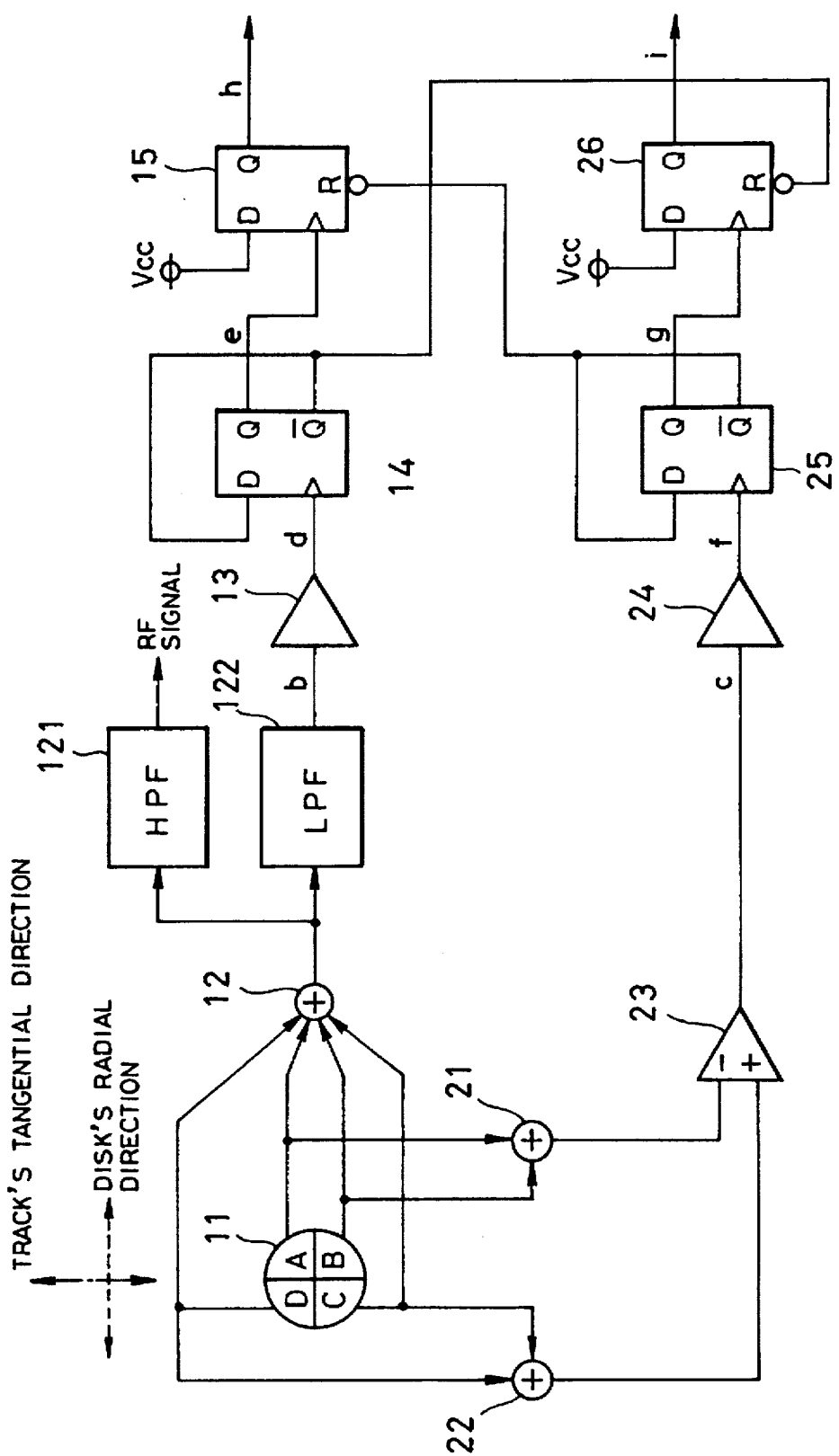
FIG. 2 is a block diagram showing a disk discriminating circuit according to one embodiment of the present invention.
Figure 3A:
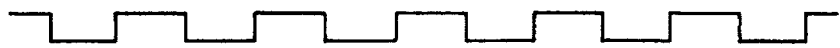
FIG. 3 is a timing chart illustrating the operation of the disk discriminating circuit in FIG. 2 with respect to a short-wavelength disk.
Figure 3B:
Figure 3C:
Figure 3D:
Figure 3E:
Figure 3F:
Figure 3G:
Figure 3H:
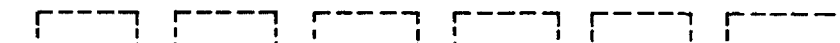
Figure 3I:
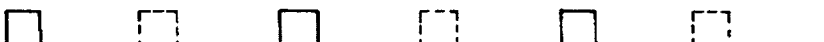
Figure 4A:
FIG. 4 is a timing chart illustrating the operation of the disk discriminating circuit in FIG. 2 with respect to a long-wavelength disk.
Figure 4B:
Figure 4C:
Figure 4D:
Figure 4E:
Figure 4F:
Figure 4G:
Figure 4H:
Figure 4I:

FIG. 2 shows the structure of the essential part of a disk discriminating circuit according to one embodiment of this invention.

Referring to FIG. 2, a 4-split light-receiving element 11 has its light-receiving surface split to four light-receiving areas A, B, C and D by two orthogonal lines. Those light-receiving areas A to D receive the reflected and diffracted light of a short-wavelength of, for example, 425 nm from the surface of a disk pit (not shown) in such a way that the two orthogonal lines are along the track's tangential direction and the radial direction of the disk, respectively.

The photoelectric conversion outputs of the individual light-receiving areas of the light-receiving element 11 are supplied to an adder 12 to be added together. The adder 12 outputs the resultant signal as a read signal having a modulated component of the light beam incident to the disk, which are dependent on the presence or absence of pits and the pit length. This read signal is supplied to a high-pass filter (HPF) 121 for the extraction of an RF signal, and is also supplied to a low-pass filter (LPF) 122 for the extraction of a focus sum signal. The focus sum signal is supplied to a comparator 13, which in turn binarizes the received focus sum signal and sends the resultant signal to the clock input terminal of a first-stage D flip-flop 14 for the RF signal. The inverted Q output of this flip-flop 14 is input to the D input terminal of the flip-flop 14, and the Q output of the flip-flop 14 is supplied to the clock input terminal of a second-stage D flip-flop 15. The flip-flop 15 has a D input terminal connected to a power supply $V_{CC}$ and outputs a first polarity discriminating signal from its Q output terminal.

The light-receiving areas A and B of the light-receiving element 11 form one of two areas line-symmetrical to each other in the track's tangential direction and the light-receiving areas C and D form the other area. The photoelectric conversion outputs of the light-receiving areas A and B are supplied to an adder 21 to be added together, and photoelectric conversion outputs of the light-receiving areas C and D are supplied to an adder 22 to be added together. The output signals of the adders 21 and 22 are supplied to the inverting input terminal and non-inverting input terminal of a differential amplifier 23 as front and back or right and left received light outputs of the reflected and diffracted light with a given track's tangential line in between. The differential amplifier 23 acquires an output signal corresponding to the difference between the supplied, received light outputs, and supplies the output signal as a push-pull signal to a comparator 24. The comparator 24 binarizes the received push-pull signal and sends the resultant signal to the clock input terminal of a first-stage D flip-flop 25 for the push-pull signal. The inverted Q output of this flip-flop 25 is input to the D input terminal of the flip-flop 25, and the Q output of the flip-flop 25 is supplied to the clock input terminal of a second-stage D flip-flop 26. The flip-flop 26 has a D input terminal connected to the power supply $V_{CC}$ and outputs a second polarity discriminating signal from its Q output terminal.

The inverted Q output of the flip-flop 25 is further supplied to the reset input terminal of the flip-flop 15, while the inverted Q output of the flip-flop 14 is supplied to the reset input terminal of the flip-flop 26.

The operation of the thus constituted disk discriminating circuit in the case where a short-wavelength disk having a pit depth $A_1$, for example, in FIG. 1 is the target can be explained with reference to the timing chart shown in FIG. 3.

In an information reading mode with the open tracking servo loop by the push-pull method, a focus sum signal b acquired from the LPF 122 has a waveform according to the shape of the undulation of a sequence of pits and a push-pull signal c acquired from the differential amplifier 23 has a waveform which has a leading phase (by approximately 90 degrees in the illustrated example) with respect to the phase of the focus sum signal b. The focus sum signal b is binarized by the comparator 13 to be a rectangular-wave signal d, and the push-pull signal c is binarized by the comparator 24 to be a rectangular-wave signal f. Those rectangular-wave signals d and f are frequency-divided by two by the flip-flops 14 and 25, thus yielding signals e and g having a duty ratio of 50%.

At the rising edge of the Q output signal e of the flip-flop 14 to set the flip-flop 15, the inverted Q output signal (inverted signal of the signal g) of the flip-flop 25 is normally at a low level, so that the flip-flop 15 maintains the reset state and its Q output signal h maintains the low level. At the rising edge of the Q output signal g of the flip-flop 25 to set the flip-flop 26, the inverted Q output signal (inverted signal of the signal e) of the flip-flop 14 is normally at a high level, so that the flip-flop 26 is set in response to the rising edge of this Q output signal g and is reset in response to the transition of the inverted Q output signal (inverted signal of the signal e) of the flip-flop 14 to the low level. In other words, the Q output signal i of the flip-flop 26 goes high and stays so over a period from the rising edge of the signal g to the rising edge of the signal e.

In short, in an information reading mode for a short-wavelength disk with the open tracking servo loop by the push-pull method, the second polarity discriminating signal i having a pulse width corresponding to the leading amount of the phase of the push-pull signal with respect to the phase of the focus sum signal is output, and the first polarity discriminating signal h keeps the low level.

The operation of the disk discriminating circuit in the case where a long-wavelength disk having a pit depth B, for example, in FIG. 1 is the target can be explained with reference to the timing chart shown in FIG. 4.

Unlike in the case of FIG. 3, the push-pull signal c acquired from the differential amplifier 23 has a waveform which has a lagging phase (by approximately 90 degrees in the illustrated example) with respect to the phase of the focus sum signal b. At the rising edge of the Q output signal e of the flip-flop 14 to set the flip-flop 15, the inverted Q output signal (inverted signal of the signal g) of the flip-flop 25 is normally at a high level, so that the flip-flop 15 is set in response to the rising edge of this Q output signal e and is reset in response to the transition of the inverted Q output signal (inverted signal of the signal g) of the flip-flop 25 to the low level. In other words, the Q output signal h of the flip-flop 15 becomes high and stays so over a period from the rising edge of the signal e to the rising edge of the signal g. At the rising edge of the Q output signal g of the flip-flop 25 to set the flip-flop 26, the inverted Q output signal (inverted signal of the signal e) of the flip-flop 14 is normally at a low level, so that the flip-flop 26 maintains the reset state and its Q output signal i maintains the low level.

As is apparent from the above, in the information reading mode for a long-wavelength disk with the open tracking servo loop by the push-pull method, the first polarity discriminating signal h having a pulse width corresponding to the lagging amount of the phase of the push-pull signal with respect to the phase of the focus sum signal is output, and the second polarity discriminating signal i keeps the low level.

Because the levels of the first and second polarity discriminating signals or the presence/absence of pulses generated for a short-wavelength disk differ from those for a long-wavelength disk, it is possible to discriminate whether the target disk is either a short wavelength or a long wavelength variety. If the subsequent stage of the disk discriminating circuit is designed in such a way as to produce a single polarity discriminating signal corresponding to the difference between the levels of the first polarity discriminating signal h and the second polarity discriminating signal i, this single polarity discriminating signal may be given with different levels respectively for a short-wavelength disk and a long-wavelength disk so as to be associated with the relationship between the polarity of the modulation level of the RF signal (equivalent to the focus sum signal) and the polarity of the modulation level of the push-pull signal, which has already been discussed in the foregoing description given with reference to FIG. 1.

The flip-flops 14 and 25 frequency-divide the binarized signals of the RF signal and push-pull signal by two to produce signals with a duty ratio of 50%. This frequency division is executed to cope with the case where the duty ratios of those binarized signals do not become 50%. This will be described more specifically. The second-stage flip-flops 15 and 26 constitute a phase comparator section which treats the rising edges of the two rectangular-wave signals as reference points for the phases to be compared. Only one of the flip-flops which receives an input with the rising edge earlier is set through the operation of setting one of the flip-flops by the rising edge of the earlier input and forcibly resetting the other flip-flop by the high-level portion of the earlier input following that rising edge. With the structure which supplies the rectangular-wave signals d and f directly to the clock input terminals of the flip-flops 15 and 26 without the frequency division and supplying the inverted signals of the signals d and f to the reset input terminals of those flip-flops, if the high-level durations of the rectangular-wave signals are short as indicated by the broken lines of d and f in FIG. 3, the aforementioned operation fails and the discrimination outputs become as indicated by the broken lines of h and i in FIG. 3. To prevent this malfunction, the frequency-divided signals of the rectangular-wave signals d and f, which are acquired from the flip-flops 14 and 25 and have duty ratios of 50%, are input to the flip-flops 15 and 26 in this embodiment. In other words, if the binarized signals of the focus sum signal and push-pull signal have duty ratios of 50% as indicated by the solid lines of d in FIG. 3 and f in FIG. 4, basically, the disk discriminating circuit can be structured without using the flip-flops 14 and 25.

Figure 5:
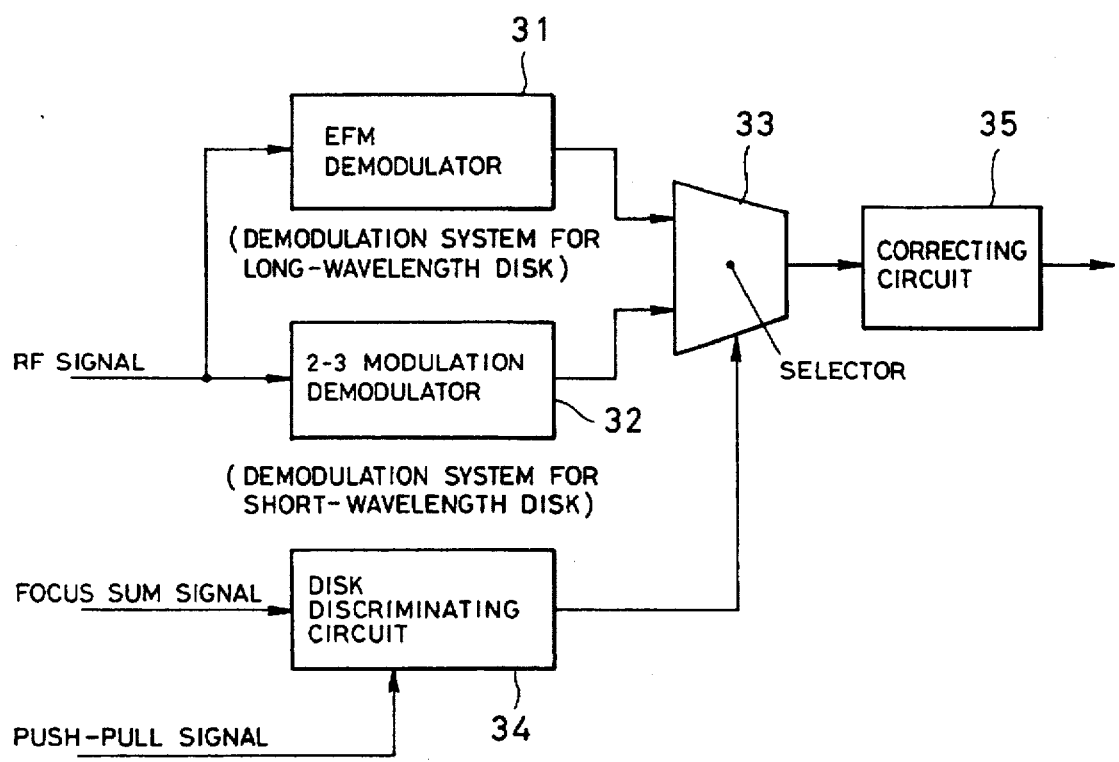
FIG. 5 is a block diagram depicting a demodulation system in an information-on-disk reproducing apparatus for both a short-wavelength disk and a long-wavelength disk, which is represented by the disk discriminating circuit in FIG. 2.

FIG. 5 exemplifies a demodulation system which is constructed by the above-described disk discriminating circuit and is used in an information-on-disk reproducing apparatus that can read information from both a short-wavelength disk and a long-wavelength disk.

In FIG. 5, an RF signal is supplied to an EFM demodulator 31 as the demodulation section for a long-wavelength disk, such as the existing CD, and to a 2-3 modulation demodulator 32 as the demodulation section for a short-wavelength disk on which, for example, 2-3 modulated signals are recorded. Those demodulators perform predetermined demodulations on the supplied RF signals and send the resultant demodulated output data to a selector 33. The selector 33 selects one of the demodulated output data in accordance with a control signal from a disk discriminating circuit 34 of this invention. The selected demodulated output data is transferred via a correcting circuit 35 to an unillustrated circuit at the subsequent stage. The control signal supplied to the selector 33 from the disk discriminating circuit 34 may be the aforementioned single polarity discriminating signal.

As the level of the control signal differs in accordance with the discrimination result from the disk discriminating circuit 34, the selector 33 selectively outputs the demodulated data from the EFM demodulator to the correcting circuit 33 in the case where a long-wavelength disk is to be read, and outputs the demodulated data from the 2-3 modulation demodulator to the correcting circuit 33 in the case where a short-wavelength disk is to be read. That is, it is possible to switch the demodulation system which matches with the disk to be read in accordance with the disk discrimination result.

Although the foregoing description of this embodiment has discussed the disk discriminating apparatus which uses an RF signal or a focus sum signal, the envelope of the RF signal may be used instead of those two signals. Although this embodiment discriminates a disk-shaped recording medium, this invention is not limited to this type, but may be adapted for any optical recording medium, whatever the configuration, as long as information is recorded in the form of pits. Although this embodiment is capable of discriminating two types of disks with different pit depths, this invention may be adapted to an apparatus which discriminates three or more types of disks or optical recording media with different pit depths.

As described above in detail, the optical recording medium discriminating apparatus according to the first aspect of this invention detects the phase difference between a read signal and a push-pull signal, both obtained by a light beam of a predetermined wavelength incident to a recording medium, and discriminates to what type of an optical recording medium the depths of recorded-information carrying pits belong, based on this phase difference. Therefore, this apparatus can discriminate different types of optical recording media of the same shape with different recording systems or reproduction systems.

An embodiment according to the second aspect of this invention will now be described with reference to the accompanying drawings.

To begin with, the principle of the disk discrimination of this invention will be described with reference to FIG. 6, which shows the same curves as shown in FIG. 1 representing the relationship between the pit depths and modulation levels.

As has been mentioned earlier, it is obvious from the graph that whatever the wavelength of the light beam is, if information is recorded with the pit depth that maximizes the modulation level of the RF signal, a push-pull signal with a sufficient amplitude (modulation level=0) cannot be acquired. That is, the tracking servo using the push-pull signal will not be successful. As a possible solution to this problem, the modulation level of the RF signal to be set may be made lower than the maximum value so that information is recorded with the pit depth that allows the push-pull signal to have a sufficient modulation level. When information is recorded with the pit depth that maximizes the modulation level of the push-pull signal, however, the modulation level of the RF signal acquired from this pit depth decreases significantly, making it likely to cause deterioration of the S/N ratio.

Let us now consider short-wavelength disks which have the same outer shape as the above-described CD, whose light beam for reading information has a wavelength set to, for example, 425 nm as one standard for the reproduction system, which are being developed for the practical use. Suppose that disks are normalized in such a way that the pit depth of this type of disk is set with priority given to the modulation level of the RF signal, i.e., within the vicinity of the maximum value of the modulation level of the RF signal and within the range where the acquired push-pull signal hardly has an amplitude (e.g., the range B).

This range B is the range of the variation in the pit depth of short-wavelength disks equivalent to the range of the variation in the pit depth of the existing CDs which are long-wavelength disks. With regard to the existing CDs, information is recorded with the pit depth of ¼ of 633 nm, and the results of measuring completed sample CDs show that the variation falls within the range A (the values 0.236 to 0.296 normalized with 633 nm) in FIG. 6. From the range A converted in terms of 433 nm, the range B of the variation in the pit depth of a short-wavelength disk is obtained. When a light beam of 425 nm to be used for a short-wavelength disk is incident to a long-wavelength disk, the acquired push-pull signal shows the modulation level close to the maximum value.

Between the cases where a short-wavelength light beam is incident to a short-wavelength disk and where the short-wavelength light beam is incident to a long-wavelength disk, the amplitude level of the push-pull signal differs. That is, the push-pull signal acquired from a long-wavelength disk and the push-pull signal acquired from a short-wavelength disk has at least an amplitude level difference in the range C in FIG. 6. The principle of the present invention for disk discrimination is to utilize the fact that the modulation level of the push-pull signal, acquired by the incident light beam of a predetermined wavelength, differs between disks with different standards for the recording pits or reproduction wavelength. The following will specifically discuss how to discriminate disks based on that principle.

Figure 7:
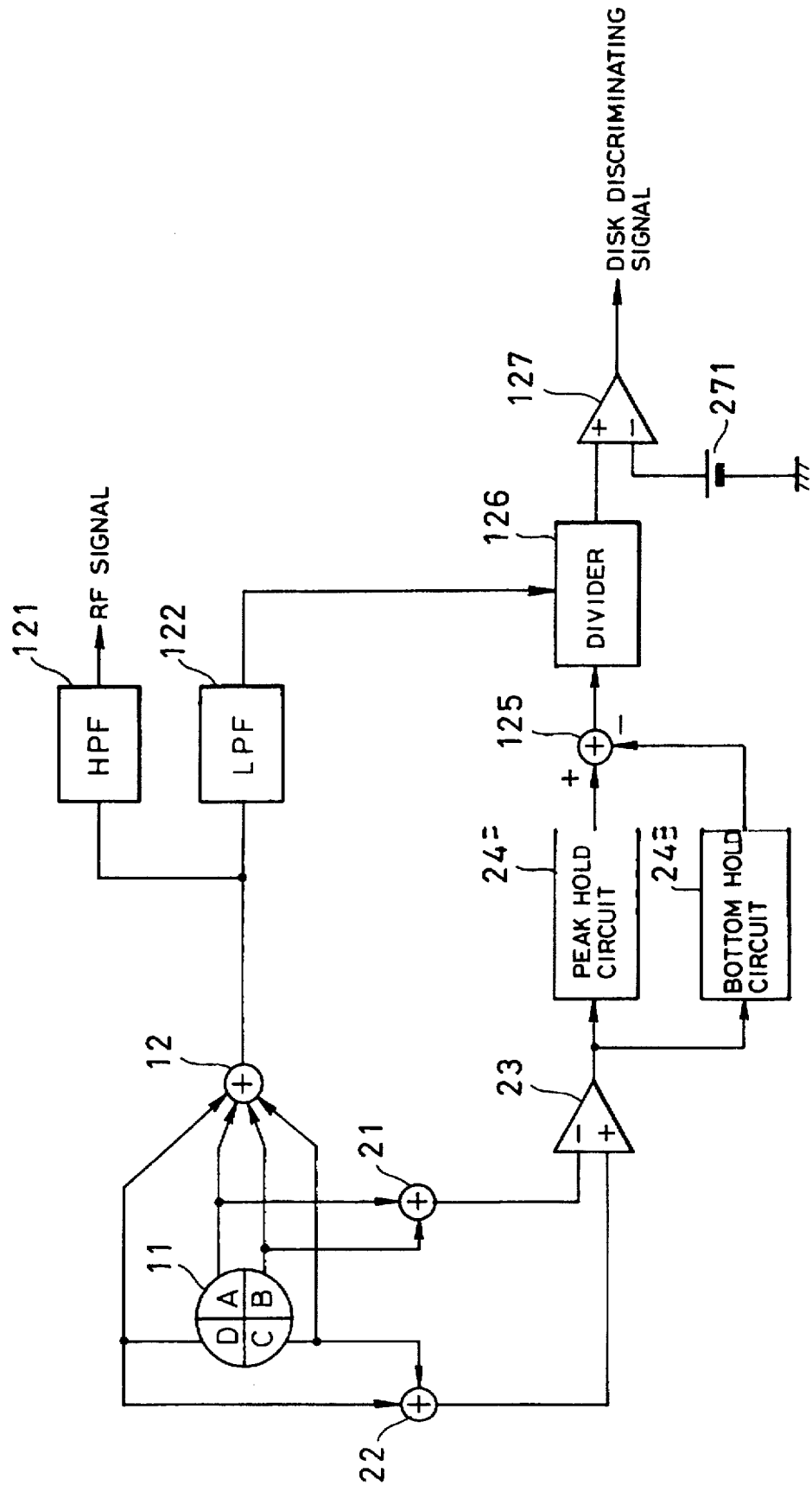
FIG. 7 is a block diagram showing a disk discriminating circuit according to another embodiment of this invention.

FIG. 7 shows the structure of the essential part of a disk discriminating circuit according to another embodiment of this invention.

Referring to FIG. 7, the 4-split light-receiving element 11 has its light-receiving surface split to the four light-receiving areas A, B, C and D by two orthogonal lines. Those light-receiving areas A to D receive the reflected and diffracted light of a short-wavelength of, for example, 425 nm from the surface of a disk pit (not shown) in such a way that the two orthogonal lines are along the track's tangential direction and the radial direction of the disk, respectively. The photoelectric conversion outputs of the individual light-receiving areas of the light-receiving element 11 are supplied to the adder 12 to be added together. The adder 12 outputs the resultant signal as a read signal having a modulated component of the light beam incident to the disk, which are dependent on the presence or absence of pits and the pit length. This read signal is supplied to a high-pass filter (HPF) 121 for the extraction of an RF signal, and is also supplied to a low-pass filter (LPF) 122 for the extraction of a focus sum signal.

The light-receiving areas A and B of the light-receiving element 11 form one of two areas line-symmetrical to each other in the track's tangential direction and the light-receiving areas C and D form the other area. The photoelectric conversion outputs of the light-receiving areas A and B are supplied to the adder 21 to be added together, and photoelectric conversion outputs of the light-receiving areas C and D are supplied to the adder 22 to be added together. The output signals of the adders 21 and 22 are supplied to the inverting input terminal and non-inverting input terminal of the differential amplifier 23 as front and back or right and left received light outputs of the reflected and diffracted light with a given track's tangential line in between. The differential amplifier 23 acquires an output signal corresponding to the difference between the supplied, received light outputs, and supplies the output signal as a push-pull signal to a peak hold circuit 24P and a bottom hold circuit 24B. Those hold circuits supply signals corresponding to the peak value and bottom value of the push-pull signal to the non-inverting input terminal and inverting input terminal of a subtracter 125, respectively. The subtracter 125 obtains the difference between the supplied signals and sends a signal according to the amplitude level of the push-pull signal to a divider 126. The divider 126, which also receives the focus sum signal from the LPF 122, divides the value of the signal from the subtracter 125 by the value of the focus sum signal, and supplies the divisional result or a signal having the level corresponding to the ratio of both input signals to the non-inverting input terminal of a comparator 127.

The comparator 127 also receives a comparison reference voltage from a power supply 271 at its inverting input terminal inverting input terminal. The comparator 127 outputs, as a disk discriminating signal, a binary signal having a predetermined high level or low level according to the level of the output of the divider 126 with respect to this comparison reference voltage. The comparison reference voltage may be a voltage having a value corresponding to the modulation level of the push-pull signal which lies within the range C in FIG. 6. In other words, the comparison reference voltage is set to a value corresponding to the modulation level at which the modulation levels of push-pull signals acquired from target disks (the disk having the pit depth in the range A and the disk having the pit depth in the range B in this case) do not overlap each other.

Figure 6:
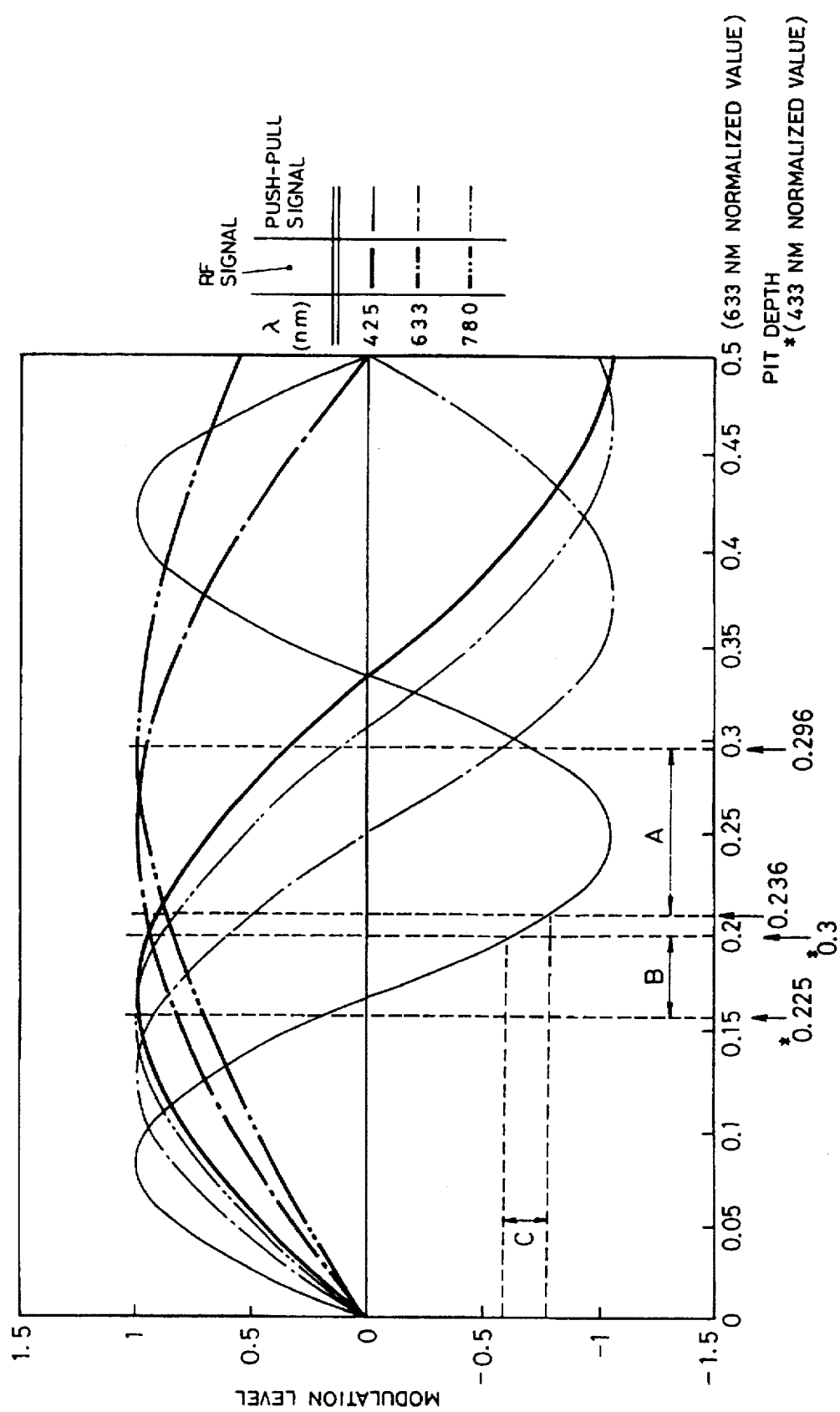
FIG. 6 is a diagram showing modulation levels of an RF signal and a push-pull signal with respect to the pit depth for each wavelength of light incident to a disk.

According to the thus constituted disk discriminating circuit, in the information reading mode for a long-wavelength disk with the open tracking servo loop by the push-pull method, when the target disk is a short-wavelength disk having the pit depth in the range B in FIG. 6, for example, the amplitude of the push-pull signal output from the differential amplifier 23 indicates zero or a small level close to zero. As the divider 126 divides this small amplitude value of the push-pull signal by the value of the focus sum signal (equivalent to the RF signal; see the modulation level of the RF signal for λ=425 in the range B in FIG. 6), which has a maximum value or a large value close thereto, the divisional result becomes zero or a small value close to zero. This means that the comparator 127 outputs a low-level disk discriminating signal. In the same information reading mode, when the target disk is a long-wavelength disk having the pit depth in the range A in FIG. 6, the amplitude of the push-pull signal output from the differential amplifier 23 indicates a maximum value or a large level close thereto. As the divider 126 divides this large amplitude value of the push-pull signal by the value of the focus sum signal, which is the middle level between the maximum value and zero, the divisional result becomes a relatively large value which means that the comparator 127 has outputted a high-level disk discriminating signal.

The reason why the amplitude level of the push-pull signal is divided by the level of the focus sum signal by the divider 126 is to eliminate the need for changing the value of the comparison reference voltage to be input into the comparator 127 due to a difference in the reflectance of a light beam at the target disk or a variation in power of the emitted light beam. Although this embodiment employs the structure for compensating for one input signal to the comparator 127 with respect to such a change in reflectance or power, the structure may be modified to compensate for the other input signal to the comparator 127, i.e., the comparison reference voltage.

Because the level of the disk discriminating signal differs between a short-wavelength disk and a long-wavelength disk, it is possible to discriminate whether the target disk is for a short wavelength or a long wavelength. The disk discrimination is also possible by using the phenomenon that the amplitude level of the push-pull signal differs depending on the pit depth, besides between the ranges A and B.

The demodulation system in FIG. 5 for use in an information-on-disk reproducing apparatus, which can read information from both a short-wavelength disk and a long-wavelength disk, can be constructed by using the above-described disk discriminating circuit.

Although the foregoing description of this embodiment has discussed the disk discriminating apparatus which uses the focus sum signal, the RF signal (its modulation level) may be used instead of the focus sum signal. Although this embodiment discriminates a disk-shaped recording medium, this invention is not limited to this type, but may be adapted for any optical recording medium, whatever the shape is, as long as information is recorded in the form of pits. Although this embodiment is capable of discriminating two types of disks with different pit depths, this invention may be adapted to an apparatus which discriminates three or more types of disks or optical recording media with different pit depths.

What is claimed is:

1. An optical recording medium discriminating apparatus for discriminating at least two types of optical recording media having pits of different depths which carry recorded information, comprising:

means for causing a light beam of a predetermined wavelength to be incident to an optical recording medium, detecting an amount of returning light therefrom and producing a read signal according to said detected amount of returning light;

means for detecting amounts of light in two areas, line-symmetrical to each other in a tangential direction of a track consisting of a sequence of pits, from said amount of returning light, and producing a push-pull signal corresponding to a difference between said amounts of light in said two areas; and phase comparing means for detecting a phase difference between said read signal and said push-pull signal, whereby a type of said optical recording medium is discriminated based on said phase difference.

2. The optical recording medium discriminating apparatus according to claim 1, wherein said phase comparing means has:

wave shaping means for binarizing said read signal and said push-pull signal to produce two rectangular-wave signals; and means for detecting a phase difference between said two rectangular-wave signals, said wave shaping means including means for compensating for duty ratios of said read signal and said push-pull signal.

3. The optical recording medium discriminating apparatus according to claim 1, wherein said read signal is a signal according to an envelope of an RF signal.

4. The optical recording medium discriminating apparatus according to claim 1, wherein said read signal is a focus sum signal.

5. The optical recording medium discriminating apparatus according to claim 2, wherein said read signal is a signal according to an envelope of an RF signal.

6. The optical recording medium discriminating apparatus according to claim 2, wherein said read signal is a focus sum signal.

7. An optical recording medium discriminating apparatus for discriminating at least two types of optical recording media having pits of different depths which carry recorded information, comprising:

means for causing a light beam of a predetermined wavelength to be incident to an optical recording medium, detecting amounts of returning light in two areas, line-symmetrical to each other in a tangential direction of a track consisting of a sequence of pits, from an amount of returning light from the optical recording medium, and producing a push-pull signal corresponding to a difference between the amounts of light in the two areas; and recording medium type discriminating means for discriminating a type of the optical recording medium by comparing a level of the push-pull signal with a reference level.

8. The optical recording medium discriminating apparatus according to claim 7, further comprising means for detecting said amount of returning light and producing a read signal according to said detected amount of returning light; and wherein said recording medium type discriminating means produces a signal according to a ratio of an amplitude level of said push-pull signal to a level of said read signal and compares a level of said produced signal with said reference level.

9. The optical recording medium discriminating apparatus according to claim 8, wherein said read signal is a signal according to an envelope of an RF signal.

10. The optical recording medium discriminating apparatus according to claim 8, wherein said read signal is a focus sum signal.

11. An optical recording medium discriminating apparatus for discriminating at least two types of optical recording media having pits of different depths which carry recorded information, comprising:

means for causing a light beam of a predetermining wavelength to be incident to an optical recording medium, detecting amounts of returning light in two areas, line-symmetrical to each other in a tangential direction of a track consisting of a sequence of pits, from the amount of returning light from the optical recording medium, and producing a push-pull signal corresponding to a difference the amounts of light in the two areas; and level comparing means for comparing a level of the push-pull signal with a reference level, whereby a type of the optical recording medium is discriminated based on a comparison result from the level comparing means; and means for detecting the amount of returning light and producing a read signal according to the detected amount of returning light, wherein the level comparing means has compensation means for compensating for the reference level based on a level of the read signal.

12. The optical recording medium discriminating apparatus according to claim 11, wherein said read signal is a signal according to an envelope of an RF signal.

13. The optical recording medium discriminating apparatus according to claim 11, wherein said read signal is a focus sum signal.

* * * * *